United States Patent
Prodin et al.

(10) Patent No.: US 8,476,832 B2
(45) Date of Patent: Jul. 2, 2013

(54) VEHICLE INTERIOR LIGHTING SYSTEM WITH WELCOME AND FAREWELL STAGES

(75) Inventors: Timothy Prodin, Dearborn, MI (US); Robert Miller, Plymouth, MI (US); Jeffrey Scott Lossing, Riverview, MI (US); Michelle Lynn McQuad Heldke, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 338 days.

(21) Appl. No.: 13/048,102

(22) Filed: Mar. 15, 2011

(65) Prior Publication Data
US 2012/0235568 A1    Sep. 20, 2012

(51) Int. Cl.
*B60Q 1/14* (2006.01)
*B60Q 1/00* (2006.01)

(52) U.S. Cl.
USPC .............................. 315/77; 315/84; 362/488

(58) Field of Classification Search
USPC ................. 315/76, 77, 82–84, 291, 307, 308, 315/363; 362/486–492, 501
See application file for complete search history.

(56) References Cited

U.S. PATENT DOCUMENTS

| | | | |
|---|---|---|---|
| 6,179,453 | B1 | 1/2001 | McMahon |
| 6,464,381 | B2 | 10/2002 | Anderson, Jr. et al. |
| 6,773,129 | B2 | 8/2004 | Anderson, Jr. et al. |
| 6,935,763 | B2 | 8/2005 | Mueller et al. |
| 7,221,264 | B2 | 5/2007 | Woo et al. |
| 7,362,217 | B2 * | 4/2008 | Woo .............................. 340/442 |
| 7,540,641 | B2 | 6/2009 | Gardner et al. |
| 2007/0122241 | A1 | 5/2007 | Sichi et al. |
| 2007/0133219 | A1 | 6/2007 | Chaloult et al. |
| 2008/0191626 | A1 | 8/2008 | Salter et al. |
| 2008/0192499 | A1 | 8/2008 | Gardner et al. |
| 2008/0198613 | A1 | 8/2008 | Cruickshank |
| 2009/0051294 | A1 | 2/2009 | Moning et al. |

FOREIGN PATENT DOCUMENTS

| | | |
|---|---|---|
| JP | 10138830 A1 | 5/1989 |
| JP | 2008174131 A | 7/2008 |
| JP | 2008174132 A1 | 7/2008 |
| JP | 2008174133 A | 7/2008 |
| WO | 0160659 A1 | 8/2001 |

* cited by examiner

*Primary Examiner* — Jimmy Vu
(74) *Attorney, Agent, or Firm* — Frank A. MacKenzie; Brooks Kushman P.C.

(57) ABSTRACT

An interior lighting system for an automotive vehicle include a first light in a first zone a second light in a second zone, and a controller illuminating the lights in a sequence including a first welcome stage, a second welcome stage, and ambient stage, and a farewell stage. The stages are defined by an operating cycle of the vehicle as determined by conditions such as vehicle entry system status, door open/closed status, and ignition status. The colors and intensities of the lights varies throughout the stages to provide both adequate task illumination and attractive lighting to provide sophisticated vehicle interior illumination that is well harmonized with the various Stages of occupant ingress and egress.

20 Claims, 3 Drawing Sheets

VEHICLE INTERIOR LIGHTING SYSTEM WITH WELCOME AND FAREWELL STAGES

TECHNICAL FIELD

The present invention relates to passenger automotive vehicles, and more specifically to an interior lighting system having multiple zones and modes of operation.

BACKGROUND

Lighting within the passenger compartment of automotive vehicles has both utilitarian and aesthetic aspects. It is primarily important to provide sufficient functional lighting in the passenger compartment to allow occupants to safely and confidently enter and exit the vehicle during conditions of darkness (night time, dusk, inside parking structures, etc.). The interior lighting should be sufficient to allow the driver and passengers to stow/retrieve personal effects (purses, phones, etc.), fasten/unfasten restraint belts, and generally be comfortably situated in the vehicle.

Aesthetic considerations, although secondary to safety and convenience, are also important. It is recognized that attractive lighting in appropriate colors and intensities may create an emotional connection with the driver and passengers which may contribute greatly to the vehicle ownership experience.

It is desirable to provide a more sophisticated vehicle interior illumination that is well harmonized with the various Stages of occupant ingress and egress.

SUMMARY

In a disclosed embodiment, an interior lighting system for an automotive vehicle comprising at least one first light in a first interior zone of the vehicle, at least one second light in a second interior zone of the vehicle, and a controller operable to illuminate the at least one first light and the at least one second light. The lights are illuminated in a sequence beginning with a first welcome stage wherein the at least one first light is illuminated at a low intensity and the at least one second light is off, the first welcome stage beginning at activation of a vehicle entry system and ending after opening of any door of the vehicle. The sequence progresses to a second welcome stage wherein the at least one first light and the at least one second light are illuminated at a high intensity, the second welcome stage beginning at the end of the first welcome stage and ending after all vehicle doors are closed and the vehicle enters an operating mode. The sequence progresses to an ambient stage wherein the at least one first light and the at least one second light are illuminated at a desired intensity, the ambient stage beginning at the end of the second welcome stage and ending after the vehicle returns to a non-operating mode and any vehicle door is opened. The sequence progresses to a farewell stage wherein the at least one first light and the at least one second light are illuminated at the high intensity, the farewell stage beginning at the end of the ambient stage and ending after all vehicle doors are closed.

At least one of the first and second lights may be illuminated by the controller in either a first color or a second color. The color(s) and/or intensities of illumination may be selected by an occupant using a color selection device interfaced with the controller.

In another disclosed embodiment, a method of controlling interior lighting in a vehicle comprises providing a first light in a first zone of a vehicle interior and a second light in a second zone of the vehicle interior, the lights being capable of projecting a plurality of colors and intensities of light. A plurality of signals is generated using a plurality of vehicle systems and sensors, and a controller receives the signals and controls illumination of the first light and the second light in a sequence comprising a first welcome stage, a second welcome stage, an ambient stage, and a farewell stage.

BRIEF DESCRIPTION OF THE DRAWINGS

Embodiments of the present invention will now be described by way of example only with reference to the accompanying drawings in which.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
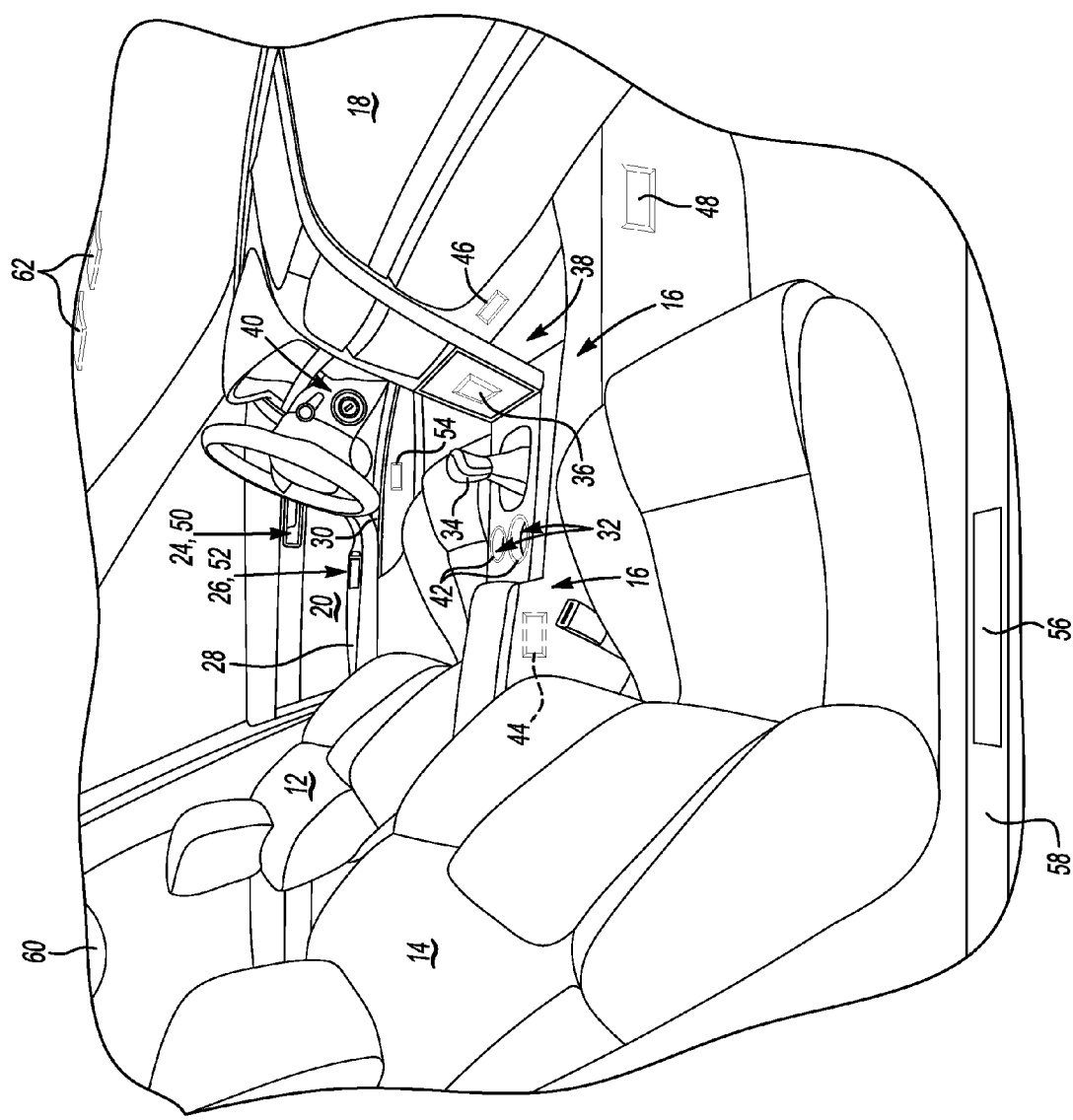
FIG. 1 is a schematic view of a front seating area of a vehicle passenger compartment.

FIG. 1 generally illustrates the front seating area of an automotive vehicle passenger compartment. Front seating area comprises a driver seat 12, a passenger seat 14, a center console 16 disposed between the seats, a forward-located instrument panel (IP) 18, and driver side and passenger side entry/exit doors 20 (only the driver side door being visible). Doors 20 include recessed latch handles 24, pull handles 26 (recessed into an armrest 28 in this embodiment), and map pockets 30 located below the armrests.

Center console 16 includes one or more cup holders 32, a gear selector handle 34, and a forward console 36. Forward console 36 may, as shown, form a forward wall of a laterally-extending "pass-through" 38 adjacent a lower central portion of IP 18. A vehicle operating mode control 40 is provided, which may take the form of a key-operated ignition switch 40 of the type well known in the automotive art.

Passenger compartment lighting is provided at various locations in the front seating area 10 and includes, for example, cup holder light(s) 42, storage bin light(s) 44, pass-through light(s) 46, and foot-well lights 48. Passenger compartment lighting may also include lights in or on the doors 20, to include latch handle recessed lights 50, pull handle lights 52, map pocket lights 54. Door sill lights 56 may be located in or adjacent to the lower door sills 58 to be exposed when the driver or passenger doors are opened. Various other lights may be provided within the passenger compartments such as an overhead dome light 60 and map or reading lamps 62. As is apparent to a person of average skill in the art, there are numerous other possibilities for passenger compartment lighting in locations in and around the instrument panel, doors, and center console, all of which are within the scope of this invention.

Figure 2:
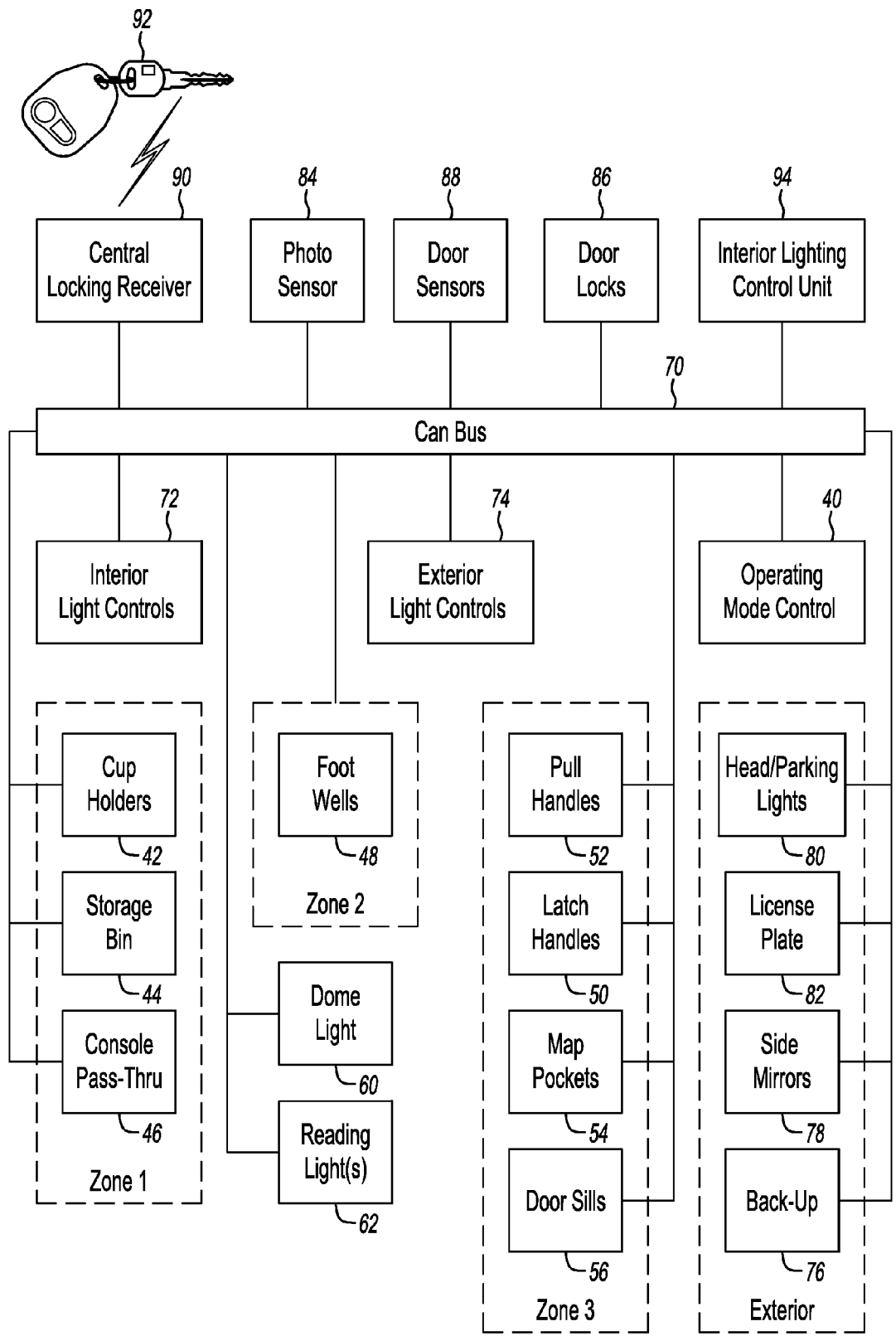
FIG. 2 is a schematic block diagram of a vehicle lighting system.

Referring now to FIG. 2, a vehicle system block diagram shows a system architecture build around a data bus 70 (such as a CAN bus) interconnecting the various components to provide electronic communication therebetween. The various passenger compartments lights identified in FIG. 1 are identified with the same reference numerals in FIG. 2, and are shown grouped into three zones numbered 1, 2, and 3.

Interior light controls 72 are shown as a single functional block but may comprise numerous separate controls (switches, buttons, etc.) disposed appropriately within the passenger compartment for manual actuation by occupants to control the various interior lights individually, and/or in sets, groups, or zones. Controls 72 may allow adjustment of intensity and/or color of the interior lighting. Interior light controls 72 may also include a voice recognition system, as is well known in the art.

The inclusion of particular interior lights in one of zones 1, 2, and 3 as illustrated in FIG. 2 is by way of example only. In this example, the zones are based on the general area of the interior, with zone 1 including lights in/on the central console area, zone 2 including lights in the front and/or rear seat foot-well areas, and zone 3 including lights in/near the doors. This is but one possible partitioning of the lights, however, any desired arrangement being within the scope of the present invention.

Exterior light controls 74 are likewise shown as a single functional block but may comprise multiple manually or voice actuated devices by which vehicle occupants control one or more vehicle exterior lights. Exterior lights may include back-up lights 76, entry lights 78 (mounted in the side mirrors, for example), headlights and/or parking lights 80, and license plate lights 82.

A photo sensor 84 is operative to detect the level of ambient light inside and/or outside the vehicle. Door locks 86 and door condition sensors 88 are provided for each entry door of the vehicle and for a trunk lid or hatch as appropriate. A central locking receiver 90 receives wireless signals from a remote transmitter 92 such as a key fob, personal digital assistant (PDA), smart phone, or any device with similar wireless connectivity, as is well known in the art.

An interior lighting controller 94 receives signals and/or other information from the various devices connected with bus 70 and controls the interior lights in the manner and method described herein. Controller 94 may be a microprocessor based device such as a computer having a central processing unit (CPU). Controller 94 may be a stand-alone device or may take the form of software code/routine(s) implemented by a multi-purpose controller.

Figure 3:
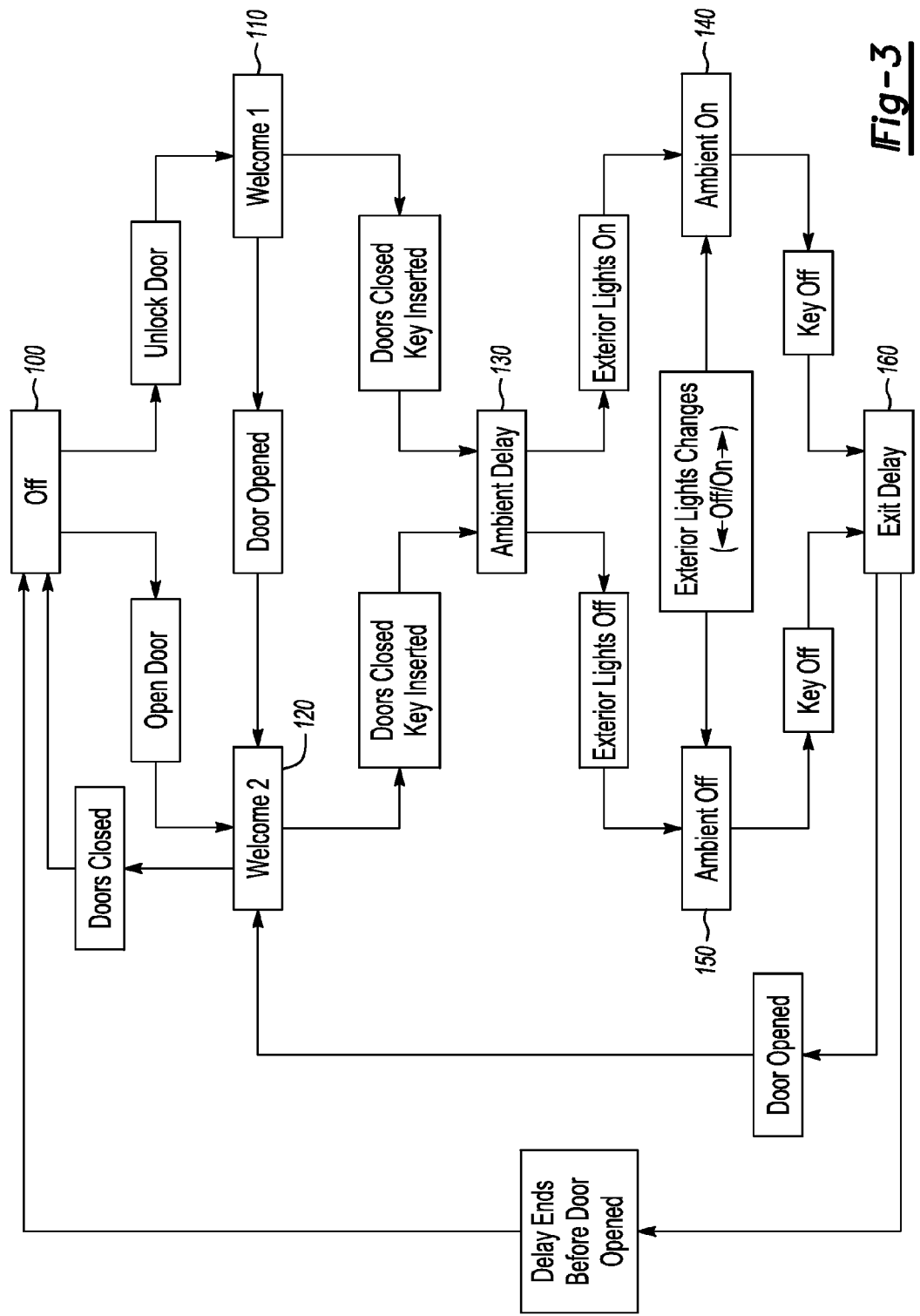
FIG. 3 is a system state diagram showing various stages of operation of an interior lighting system.

FIG. 3 is a generalized system state diagram showing the operation of one possible embodiment of the invention. At block 100, the interior lighting system is off, with no interior lights illuminated. This may be the initial state when the vehicle has been unattended for some pre-defined length of time and/or the vehicle is occupied but no command inputs have been made. If the vehicle is in a locked condition, the action of unlocking the doors, such as manually with a key or using a wireless signal received by central locking receiver 90, causes the system to progress to Welcome Stage 1, block 110. In Welcome Stage 1, all or some subsets of the lights in at least one of the pre-determined zones are illuminated at a reduced or partial intensity to facilitate entry of a driver and/or passengers into the vehicle. For example, in a possible embodiment, Welcome Stage 1 includes illumination at one-half intensity of all lights included in zones 1 and 3, the lights of zone 2 remaining off. Welcome Stage 1 lighting is intended to provide enough light for persons approaching the vehicle to view the interior of the vehicle before a door is opened.

In a typical sequence of operation, persons approaching the now unlocked vehicle will open one or more of the doors. Opening of a door causes the system to progress (following the horizontal line in FIG. 3) to Welcome Stage 2, block 120. Welcome Stage 2 lighting may, for example, comprise full intensity illumination of all lights in all interior lighting zones. Welcome Stage 2 lighting is intended to provide maximum illumination of the vehicle interior as the persons enter the vehicle and situate themselves in their respective seats.

If the vehicle is already unlocked at the initial state (block 100) and a door is opened, the system transitions directly from the off state (block 100) to Welcome Stage 2 (block 120).

When the system is in Welcome Stage 2, the next transition occurs when all vehicle doors are closed and the vehicle enters an operating mode. Entry into the operating mode may be indicated or caused by a key being inserted into an ignition switch and, for brevity, FIG. 3 indicates the KEY INSERTED condition as causing the transition. However, it is to be understood that the operating mode may be initiated by some other action by the driver indicating intent to start the engine or otherwise power-up the vehicle for a driving cycle. Such actions may include activation of an engine start button (not shown) or an appropriate voice command for vehicles equipped with a voice recognition system.

When these necessary conditions are met, the system progresses to block 130 where an ambient delay may be provided to maintain the existing lighting conditions for an appropriate length of time, the duration of which should allow the system to settle into a stable state and avoid a "race" condition. For example, if the insertion of an ignition key is the indication that the vehicle is entering an operating mode, a short delay may be provided after key insertion.

It is alternatively possible for the system to progress directly from block 110 to block 130. This may occur, for example, if the vehicle was occupied and all doors were closed at the initial off state (block 100), so that the operating mode may be entered without an opening and subsequent closing of a door.

The length of the ambient delay at block 130 may be preset by the vehicle or system manufacturer, and/or the delay may be adjusted by the vehicle operator, thereby allowing the delay to be set to a driver's preference.

After the ambient delay, the system progresses to either the Ambient On Stage (block 140) or the Ambient Off Stage (block 150) depending upon whether the vehicle exterior lights are in an ON or OFF condition. The exterior lights may be in the ON condition due to the driver making this selection, or due to the system being in an "AUTO" setting in which exterior light operation is controlled by photo sensor 84, as is well known in the art. In conditions of darkness, the exterior lights will be illuminated. Conversely, if the daylight sensor 84 detects sufficient daylight that exterior lights are not required for safety and/or visibility, the exterior lights remain off. As indicated by the horizontal arrow connecting blocks 140 and 150, any change to the exterior lighting condition (between ON and OFF) triggers the corresponding transition between Ambient On and Ambient Off.

The Ambient Stage continues throughout the period in which the vehicle is in operation and terminates after the vehicle returns to a non-operating mode, as may be indicated by an ignition switch/key moving to OFF or Accessory. After the return to the non-operating mode, an exit delay (block 160) may be initiated so that the lighting of the Ambient Stage continues. As with the ambient delay discussed above, the exit delay interval may be set by the manufacturer and/or later modified by the vehicle user. The time delay is preferably of an appropriated duration to allow the system to settle into a stable state and avoid a "race" condition. If no doors are opened during this delay interval, the system transitions back to Off (block 100). The duration of the exit delay should be selected to minimize the likelihood that a vehicle battery will be depleted by keeping the lights illuminated for an extended length of time.

During the Ambient Stage, some subset of the interior lights compatible with safe and convenient operation of the vehicle will be illuminated. In one possible embodiment, zones 1 and 3 are illuminated at a desired intensity which is preferably user/selectable. If a vehicle is equipped with adjustable color lighting, the color of the illumination of one or more of the lights in the zones may be selected by a customer/driver to achieve a desired aesthetic effect. A system allowing for an operator to select/adjust the lighting color as well as intensity is disclosed in U.S. Patent Application Publication 2008/0191626A1, the disclosure of which is incorporated herein by reference.

From block 160, the system transition back to Welcome Stage 2 (block 120) when any vehicle door is opened. At this point in the driving cycle, it is appropriate to refer to the lighting as a Farewell Stage, however the actual status of the various lighting components may be the same as discussed above in relation to Welcome Stage 2, since the convenience and safety requirements for entering and exiting the vehicle are generally similar.

When all vehicle doors are closed, the system transitions to the off state, block 100. An appropriate delay may be incorporated, the delay being user selectable if desired.

In a preferred embodiment of the invention, lighting during the Welcome and Farewell Stages is a color (or combination of colors) set by the vehicle manufacturer and selected to create a desired harmonious lighting effect in combination with the colors of the vehicle interior. This pre-set color (or combination of colors) is referred to as vehicle signature color (or palette). A signature palette may, for example, comprise a different color or hue for the lights within each zone.

Other interior lights may operate independently of the control scheme illustrated in FIG. 3 during any one or more of the illumination stages. For example, dome lamp 60 and reading lights 62 may be controlled solely by manually operated on/off switches and/or door open/closed switches.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An interior lighting system for an automotive vehicle comprising:
   a first light in a first interior zone of the vehicle;
   a second light in a second interior zone of the vehicle; and
   a controller operable to illuminate the first light and the second light in a sequence comprising:
   a first welcome stage wherein the first light is illuminated at a low intensity and the second light is off, the first welcome stage beginning at activation of a vehicle entry system and ending after opening of any door of the vehicle;
   a second welcome stage wherein the first light and the second light are illuminated at a high intensity, the second welcome stage beginning at the end of the first welcome stage and ending after all vehicle doors are closed and the vehicle enters an operating mode;
   an ambient stage wherein the first light and the second light are illuminated at a desired intensity, the ambient stage beginning at the end of the second welcome stage and ending after the vehicle returns to a non-operating mode and any vehicle door is opened; and
   a farewell stage wherein the first light and the second light are illuminated at the high intensity, the farewell stage beginning at the end of the ambient stage and ending after all vehicle doors are closed.

2. The apparatus according to claim 1 wherein at least one of the first and second lights is illuminated by the controller in either a first color or a second color.

3. The apparatus according to claim 2 wherein at least one of the first and second lights is illuminated in the first color during a first of the stages and in the second color during a second of the stages.

4. The apparatus according to claim 3 wherein the first color is a pre-set color and is produced during all stages except for the ambient phase, and the second color is produced during the ambient phase and is selected by a user from a color palette.

5. The apparatus according to claim 1 further comprising a color selection device interfaced with the controller and operable by a vehicle occupant to select from a range of colors and/or intensities of illumination produced by at least one of the lights.

6. The apparatus according to claim 1 wherein the first zone comprises one of a door zone, a foot-well zone, and a console zone.

7. The apparatus according to claim 1 wherein the second zone comprises one of a door zone, a foot-well zone, and a console zone.

8. The apparatus according to claim 1 wherein at least one of the zones comprises a light in a door sill.

9. The apparatus according to claim 1 further comprising a third light in a third interior zone of the vehicle, the controller operable to illuminate the third light during at least one of the stages.

10. The apparatus according to claim 1 wherein the activation of the entry system triggering the first welcome stage comprises unlocking of a vehicle door lock.

11. The apparatus according to claim 10 wherein the controller is further operable to bypass the first welcome stage if the vehicle door is unlocked at the start of the sequence.

12. The apparatus according to claim 1 wherein the vehicle's entry into the operating mode is determined by a key being inserted into a vehicle ignition switch.

13. A method of controlling interior lighting in a vehicle comprising:
   providing a first light in a first zone of a vehicle interior and a second light in a second zone of the vehicle interior, the lights being capable of projecting a plurality of colors and intensities of light;
   generating a plurality of signals using a plurality of vehicle systems and sensors; and
   operating a controller to receive the plurality of signals and, in response at least partially to the signals, controlling illumination of the first light and the second light in a sequence comprising:
   a first welcome stage wherein the first light is illuminated at a low intensity and the second light is off, the first welcome stage beginning at activation of a vehicle entry system and ending after opening of any door of the vehicle;
   a second welcome stage wherein the first light and the second light are illuminated at a high intensity, the second welcome stage beginning at the end of the first welcome stage and ending after all vehicle doors are closed and the vehicle enters an operating mode;

an ambient stage wherein the first light and the second light are illuminated at a desired intensity, the ambient stage beginning at the end of the second welcome stage and ending after the vehicle returns to a non-operating mode and any vehicle door is opened; and a farewell stage wherein the first light and the second light are illuminated at the high intensity, the farewell stage beginning at the end of the ambient stage and ending after all vehicle doors are closed.

14. The method according to claim 13 wherein the activation of the entry system triggering the first welcome stage comprises unlocking of a vehicle door lock.

15. The method according to claim 14 wherein the controller is further operable to bypass the first welcome stage if the vehicle door is unlocked at the start of the sequence.

16. The method according to claim 1 wherein the vehicle's entry into the operating mode is determined by a key being inserted into a vehicle ignition switch.

17. An interior lighting system for an automotive vehicle comprising:
   a first light in a first interior zone of the vehicle;
   a second light in a second interior zone of the vehicle; and
   a controller operable to illuminate the first light and the second light in a sequence comprising:
   a first welcome stage wherein the first light is illuminated at a low intensity and the second light remains off, the first welcome stage beginning at an earlier of a vehicle entry system being activated or any vehicle door being opened, and ending at an earlier of expiration of a first delay and any door of the vehicle being opened;
   a second welcome stage wherein the first light and the second light are illuminated at a high intensity, the second welcome stage beginning at the end of the first welcome stage and ending at an earlier of expiration of a second delay after all vehicle doors are closed and the vehicle entering an operating phase;
   an ambient stage wherein the first light and the second light are illuminated at a desired intensity, the ambient stage beginning at the end of the second welcome stage and ending after the vehicle returns to a non-operating condition and the earlier of expiration of a third delay after a vehicle door is opened and expiration of a fourth delay after the vehicle has returned to the non-operating condition; and
   a farewell stage wherein the first light and the second light are illuminated at a/the high intensity, the farewell stage beginning at the end of the ambient stage and ending at an earlier of expiration of a fifth delay after the entry system is in a secured condition and expiration of a sixth delay after the farewell stage begins.

18. The apparatus according to claim 17 further comprising a third light in a third interior zone of the vehicle, the controller operable to illuminate the third light during at least one of the stages.

19. The apparatus according to claim 17 wherein at least one of the first and second lights is illuminated by the controller in either a first color or a second color.

20. The apparatus according to claim 19 wherein at least one of the first and second lights is illuminated in the first color during a first of the stages and in the second color during a second of the stages.

* * * * *